United States Patent
Hashimoto et al.

(10) Patent No.: US 12,145,532 B2
(45) Date of Patent: Nov. 19, 2024

(54) ON-VEHICLE COMMUNICATION SYSTEM, SADDLE RIDING VEHICLE, AND PROGRAM

(71) Applicant: HONDA MOTOR CO., LTD., Tokyo (JP)

(72) Inventors: Masayuki Hashimoto, Tokyo (JP); Wataru Ogawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/033,079

(22) PCT Filed: Oct. 8, 2021

(86) PCT No.: PCT/JP2021/037467
§ 371 (c)(1),
(2) Date: Apr. 21, 2023

(87) PCT Pub. No.: WO2022/102310
PCT Pub. Date: May 19, 2022

(65) Prior Publication Data
US 2023/0391288 A1    Dec. 7, 2023

(30) Foreign Application Priority Data

Nov. 10, 2020   (JP) ................ 2020-187309

(51) Int. Cl.
*B60R 25/24*   (2013.01)
*G07C 9/00*   (2020.01)
*H04B 17/318*   (2015.01)

(52) U.S. Cl.
CPC ........ *B60R 25/245* (2013.01); *G07C 9/00309* (2013.01); *H04B 17/318* (2015.01);
(Continued)

(58) Field of Classification Search
None
See application file for complete search history.

(56) References Cited

U.S. PATENT DOCUMENTS 6,718,227 B1 *   4/2004   Schemmel ............ G03F 9/7088
                                                    700/229
8,099,097 B2 *   1/2012   Miyata .................. H04W 36/08
                                                    370/332
(Continued)

FOREIGN PATENT DOCUMENTS

JP   2003-041823   2/2003
JP   2007-118899   5/2007
(Continued)

OTHER PUBLICATIONS

International Search Report and Written Opinion for International Application No. PCT/JP2021/037467 mailed on Dec. 14, 2021, 10 pages.
(Continued)

*Primary Examiner* — Carlos Garcia
(74) *Attorney, Agent, or Firm* — Amin, Turocy & Watson, LLP

(57) ABSTRACT

An on-vehicle communication system of an embodiment includes: an antenna that is provided on a vehicle and performs a close-range communication with a user terminal device present in a communication area around the vehicle; and a control portion that is provided on the vehicle and executes a predetermined authentication process when a radio wave strength of a signal received from the user terminal device via the antenna or a signal received by the user terminal device from the antenna is equal to or more than a threshold value, wherein the control portion notifies a user of information on a target communication position at which the user terminal device should be located when registering the threshold value by using a notification portion.

8 Claims, 13 Drawing Sheets

(52) U.S. Cl.
CPC ... *B60R 2325/101* (2013.01); *B60R 2325/306* (2013.01); *G07C 2009/00793* (2013.01); *G07C 2009/00984* (2013.01); *G07C 2209/63* (2013.01)

(56) References Cited

U.S. PATENT DOCUMENTS

| | | | | |
|---|---|---|---|---|
| 9,995,061 | B2* | 6/2018 | Ishikawa | B60R 25/245 |
| 2015/0002264 | A1* | 1/2015 | Kitahara | G07C 9/20 |
| | | | | 340/5.61 |
| 2017/0292291 | A1 | 10/2017 | Ishikawa et al. | |

FOREIGN PATENT DOCUMENTS

| | | |
|---|---|---|
| JP | 2016-084610 | 5/2016 |
| JP | 2016-113885 | 6/2016 |
| JP | 2018-145615 | 9/2018 |
| JP | 2020-051970 | 4/2020 |
| KR | 10-2027347 | 10/2019 |
| WO | 2016/063496 | 4/2016 |

OTHER PUBLICATIONS

Indian Office Action for Indian Patent Application No. 202347031437 dated Aug. 16, 2024.

\* cited by examiner

DISPLAY EXAMPLE OF TARGET COMMUNICATION POSITION

ON-VEHICLE COMMUNICATION SYSTEM, SADDLE RIDING VEHICLE, AND PROGRAM

TECHNICAL FIELD

The present invention relates to an on-vehicle communication system, a saddle riding vehicle, and a program.

Priority is claimed on Japanese Patent Application No. 2020-187309, filed on Nov. 10, 2020, the contents of which are incorporated herein by reference.

BACKGROUND

In the field of wireless door locks, a technique is known in which a communication area between an on-vehicle device and a wireless key is set around a vehicle, and a lock is released based on a communication result with a wireless key present in the set communication area. The communication area is changed by changing a setting level of radio waves of the wireless key (for example, refer to Patent Document 1).

RELATED ART DOCUMENTS

Patent Documents

[Patent Document 1]
Japanese Unexamined Patent Application, First Publication No. 2003-41823

SUMMARY OF INVENTION

Problems to be Solved by the Invention

However, when a user can arbitrarily vary the setting level of the radio waves of the wireless key, the communication area may become inappropriate in some cases.

An object of an aspect of the present embodiment is to provide an on-vehicle communication system, a saddle riding vehicle, and a program that can prevent a communication area of an on-vehicle device from becoming inappropriate.

Means for Solving the Problem

An on-vehicle communication system according to a first aspect of the present invention includes: an antenna that is provided on a vehicle and performs a close-range communication with a user terminal device present in a communication area around the vehicle; and a control portion that is provided on the vehicle and executes a predetermined authentication process when a radio wave strength of a signal received from the user terminal device via the antenna or a signal received by the user terminal device from the antenna is equal to or more than a threshold value, wherein the control portion notifies a user of information on a target communication position at which the user terminal device should be located when registering the threshold value by using a notification portion.

A second aspect is the on-vehicle communication system according to the first aspect described above, wherein notification may be performed by the notification portion using the information on the target communication position as information on a relative position with respect to the vehicle.

A third aspect is the on-vehicle communication system according to the first or second aspect described above, wherein the target communication position may be a position on an opposite side of the antenna across a shield portion that is a configuration member of the vehicle and shields radio waves.

A saddle riding vehicle according to a fourth aspect of the present invention includes the on-vehicle communication system according to the third aspect described above.

A fifth aspect is the saddle riding vehicle according to the fourth aspect described above, wherein the shield portion may be a steering shaft.

A sixth aspect is the saddle riding vehicle according to the fifth aspect described above, wherein the target communication position may be a further rearward position of the vehicle than the steering shaft when the antenna is arranged at a further forward position of the vehicle than the steering shaft, and the target communication position may be a further forward position of the vehicle than the steering shaft when the antenna is arranged at a further rearward position of the vehicle than the steering shaft.

A seventh aspect is the on-vehicle communication system according to any of the first to third aspects described above, wherein the control portion may cause the user terminal device or a display portion provided on the vehicle to display the target communication position.

A program according to an eighth aspect of the present invention causes an on-vehicle computer to: perform a close-range communication, by using an antenna that is provided on a vehicle, with a user terminal device present in a communication area around the vehicle; execute a predetermined authentication process when a radio wave strength of a signal received from the user terminal device via the antenna or a signal received by the user terminal device from the antenna is equal to or more than a threshold value; and notify a user of information on a target communication position at which the user terminal device should be located when registering the threshold value by using a notification portion.

Advantage of the Invention

According to the first to eighth aspects described above, it is possible to prevent the communication area of an on-vehicle device from becoming inappropriate.

DESCRIPTION OF THE EMBODIMENTS

Figure 1:
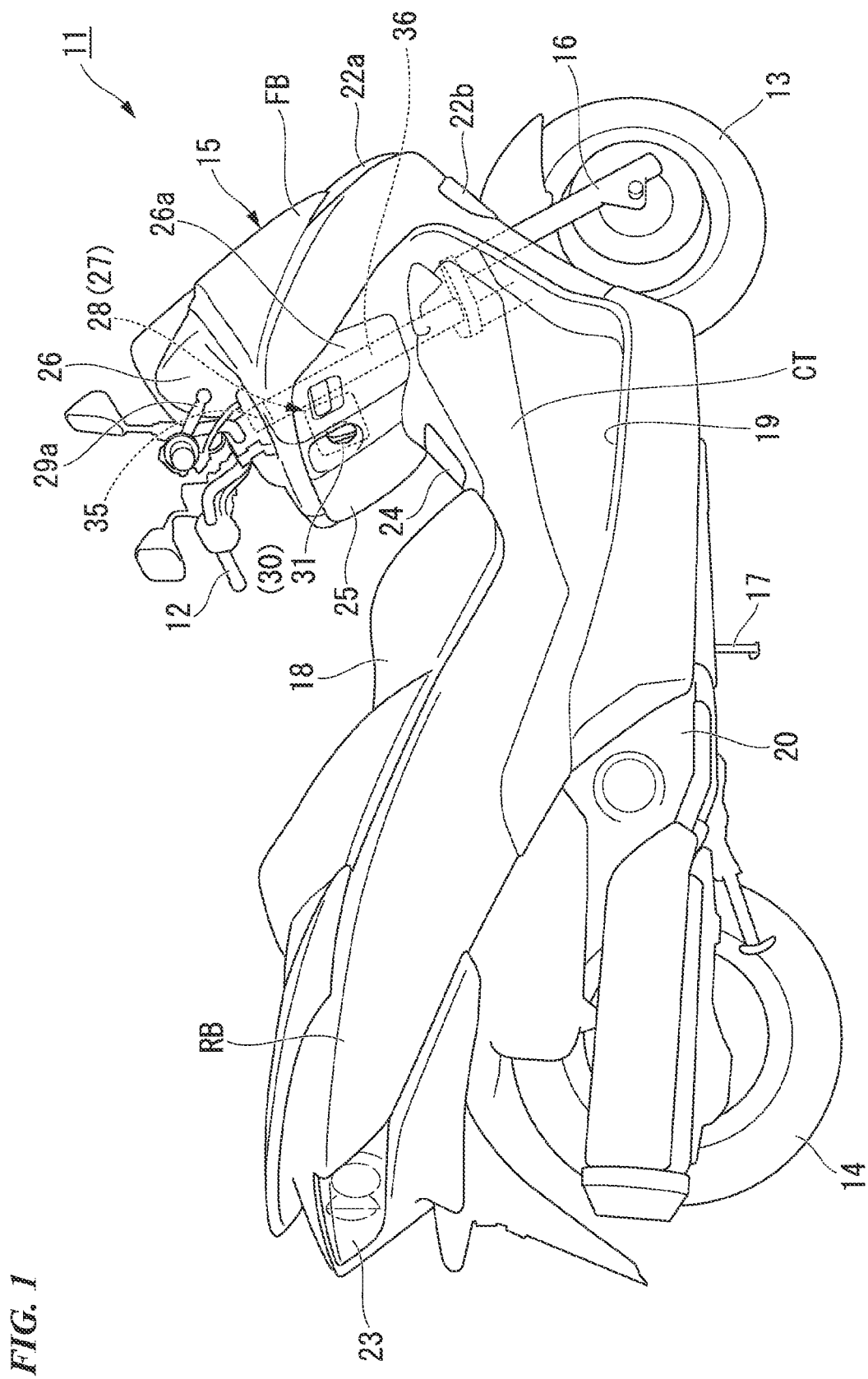
FIG. 1 is a perspective view of a motorcycle which is an example of a vehicle according to an embodiment.

Hereinafter, an embodiment of the present invention will be described with reference to the drawings. FIG. 1 is a perspective view of a motorcycle 11 which is an example of a vehicle according to an embodiment. As shown in FIG. 1, the motorcycle 11 is, for example, a unit-swing-type scooter-type motorcycle.
<Entire Vehicle>

As shown in FIG. 1, the motorcycle 11 includes a front wheel 13 which is a steering wheel and a rear wheel 14 which is a drive wheel. The front wheel 13 is supported by a front fork 16 and can be steered by a bar handle 12. The rear wheel 14 is supported by a swing unit 20 and can be driven by a reciprocal engine (an internal combustion engine, hereinafter simply referred to as an engine) 21 described later. The swing unit 20 integrally includes the engine 21 and, for example, a V-belt type continuously variable transmission (not shown).

A steering system component that includes the bar handle 12, the front fork 16, and the front wheel 13 are steerably supported by a front end portion of a vehicle body frame (not shown). The swing unit 20 and the rear wheel 14 are supported swingably upward and downward by a rear lower portion of the vehicle body frame. A side stand 17 that supports a vehicle body in a standing attitude inclined to the left side is provided in a retractable manner on a left lower portion of the vehicle body frame. The circumference of the vehicle body frame is covered by a vehicle body cover 15.

The bar handle 12 is fixed to an upper portion of the front fork 16 via a top bridge 35 and a steering shaft 36. The top bridge 35 rotates with the steering shaft 36.

The motorcycle 11 includes a pair of right and left step floors 19 on which a driver seated on a seat 18 places his/her foot, a center tunnel CT that extends in a vehicle forward-rearward direction between the right and left step floors 19, a front body FB that continues to front portions of the center tunnel CT and the right and left step floors 19, and a rear body RB that continues to rear portions of the center tunnel CT and the right and left step floors 19.

A head lamp 22a and a front winker 22b are arranged on a front upper portion of the front body FB. A rear combination lamp 23 that includes a tail lamp, a brake lamp, and a rear winker is arranged on a rear portion of the rear body RB. The seat 18 on which a passenger is seated is supported on the rear body RB. A fuel lid 24 that opens and closes a fill opening arrangement space is provided on an upper surface of the center tunnel CT.

The seat 18 is, for example, rotated upward and downward about a hinge shaft arranged on a front end portion and opens and closes an upper portion of the rear body RB. An article storage portion (not shown) is arranged below the seat 18.

The passenger can be seated on the seat 18 in a closed state in which the seat 18 closes the upper portion of the rear body RB. The article storage portion below the seat 18 can be accessed in an open state in which the seat 18 opens the upper portion of the rear body RB.

A display panel 26 is arranged on an upper portion of the front body FB. The display panel 26 includes, for example, a LCD (Liquid Crystal Display), an organic EL (Electroluminescence) display device, or the like. The display panel 26 displays a smart indicator including a speed meter and the like, a message to a user, an illustration, and the like.

A handle lock module 27 is accommodated inside the front body FB. The handle lock module 27 integrally includes a handle lock mechanism 28 which is a main body portion, a smart control unit 300 described later, and a main switch 30 which is a main electric power switch of the motorcycle 11.

Figure 2:
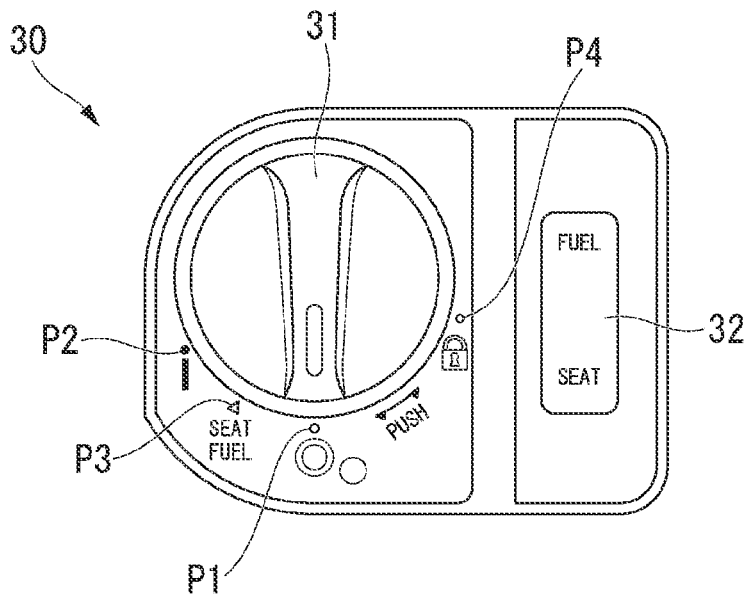
FIG. 2 is a view showing a main switch knob of the motorcycle.

FIG. 2 is a view showing a main switch knob of the motorcycle. The main switch knob 31 includes an OFF position P1 at which the main switch 30 is in an OFF state, an ON position P2 at which the main switch 30 is in an ON state, a seat/fuel lock release position P3 which is located between the OFF position P1 and the ON position P2 and at which an open operation of the seat 18 and the fuel lid 24 is enabled, and a lock position P4 to which the main switch knob 31 is rotated from the OFF position P1 to an opposite side of the ON position P2 while being pushed and at which a lock of each portion of the vehicle including a handle lock is in a locked state. In the state where the main switch 30 is not started, the main switch knob 31 is located at the OFF position P1.

When the main switch knob 31 is at the seat/fuel lock release position P3, operation of a seat/fuel lock release switch 32 adjacent to the main switch knob 31 is enabled or activated. The seat/fuel lock release switch 32 is a seesaw switch. One of the seat/fuel lock release switch 32 is a switch that selects unlocking of the seat 18. Another of the seat/fuel lock release switch 32 is a switch that selects unlocking of the fuel lid 24.

Figure 3:
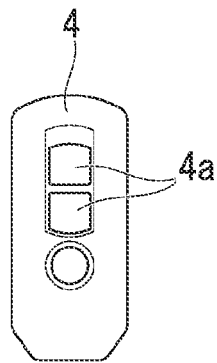
FIG. 3 is a view showing a dedicated remote key of the motorcycle.

FIG. 3 is a view showing a dedicated remote key 4 of the motorcycle 11. The dedicated remote key 4 is, for example, a FOB key, an electronic key, or the like, and includes one or more operation buttons 4a. The dedicated remote key 4 is an example of a key of the motorcycle 11, and a user terminal device 100 described later may be utilized as the key of the motorcycle 11.

In the main switch 30, the main switch knob 31 as an operation unit is arranged on an inner panel 25 of the step floor 19 side (rear surface side) of the front body FB. The rotation operation of the main switch knob 31 is enabled or activated in a state (for example, in a state where ID authentication is established) where authenticity of the dedicated remote key 4 or the user terminal device 100 is confirmed by an authentication process.

By the rotation operation (for example, the main switch knob 31 pushing operation) of the main switch knob 31, the state of the main switch 30 becomes activated. When the main switch 30 becomes an activated state, for example, an illumination device provided on the main switch 30 is lit, and an ON operation of the main switch knob 31 is enabled or activated (an unlocked state). By performing an operation by which the main switch knob 31 is located at the ON position P2, the main switch 30 becomes an ON state.

By the main switch 30 being activated, electric power is supplied to a control device 40 described later, starting of the engine 21 is enabled, and unlocking of an electromagnetic lock (an electrically operated lock device operated by a solenoid) 70 of an open-close body such as the seat 18 or the fuel lid 24 is enabled. The main switch knob 31 also serves as an operator that performs locking and unlocking of the handle lock mechanism 28.

That is, in the main switch 30, the authenticity of the user terminal device 100 is confirmed by the authentication process (the activated state), and the ON operation of the main switch knob 31 is enabled or activated (the unlocked state).

On the other hand, in the unlocked state of the main switch knob 31, by the user terminal device 100 being moved away, the user terminal device 100 remaining in a closed space, or the like, the communication between the user terminal device 100 and the motorcycle 11 disappears, and thereby, the main switch knob 31 is disabled or becomes invalid (the locked state). The device that is unlocked by the starting of the main switch 30 and is locked by communication disconnection with the user terminal device 100 or the like includes, for example, the handle lock mechanism 28, a lock of the seat 18, a lock of the fuel lid 24, and the like.

Figure 4:
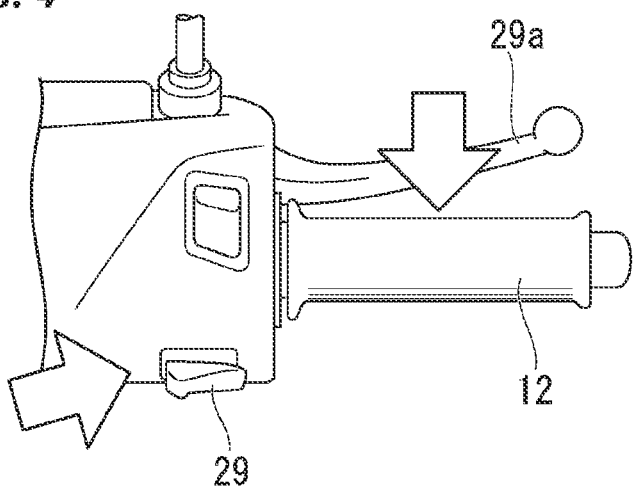
FIG. 4 is a view showing the vicinity of a starter switch of the motorcycle.

FIG. 4 is a view showing the vicinity of a starter switch 29 of the motorcycle 11. Ignition of the engine 21 is performed by gripping a brake lever 29*a* on the right side of the bar handle 12 and pushing the starter switch 29 in the ON state of the main switch 30. By pushing the starter switch 29, an engine start control portion 42 of the control device (described later) drives a starter motor 21*a* provided on the engine 21 and controls ignition and fuel injection, and thereby, the engine 21 is started.

<On-Vehicle Communication System 1>

Figure 5:
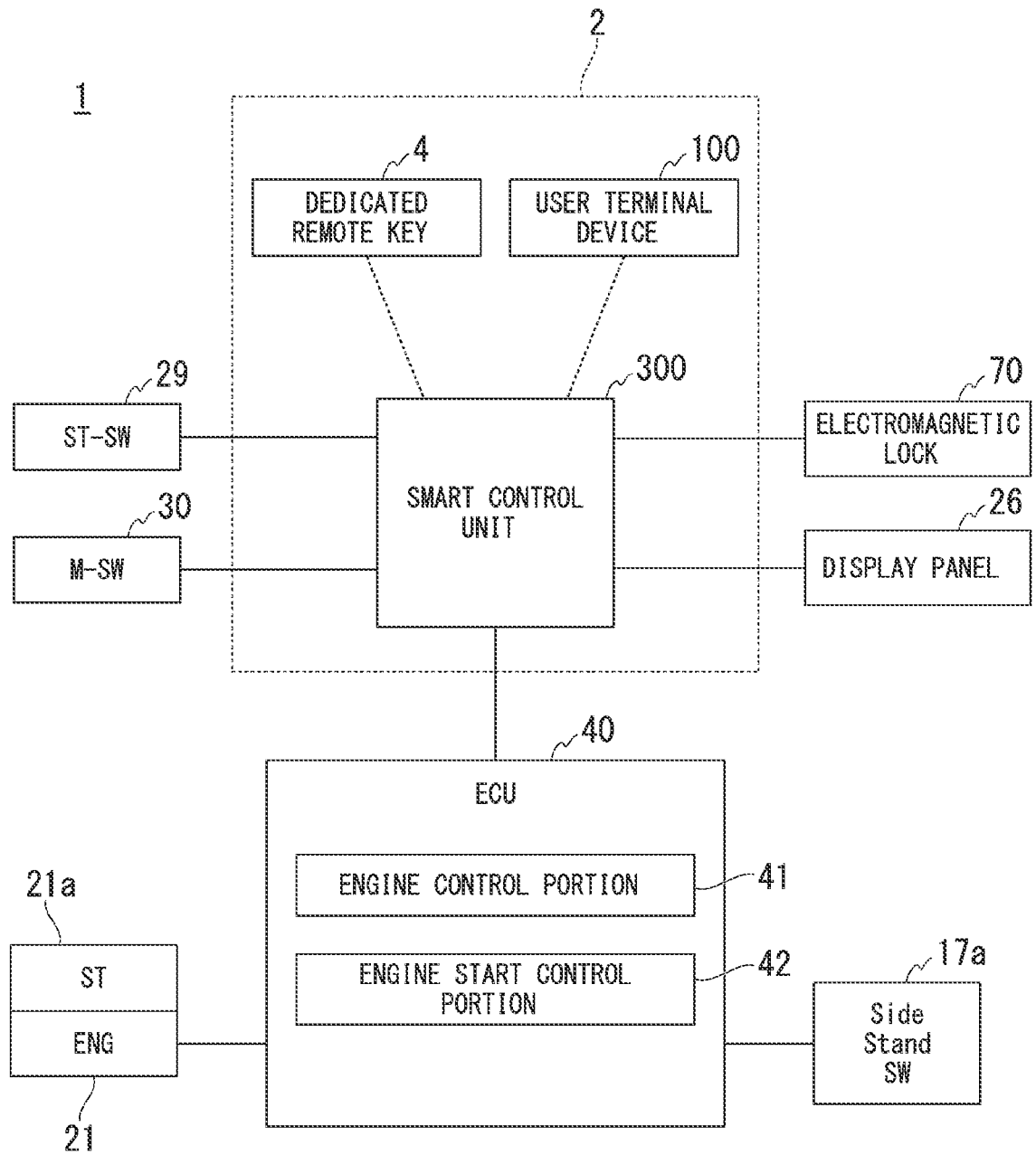
FIG. 5 is a functional block diagram of an on-vehicle communication system according to the embodiment.

FIG. 5 is a functional block diagram of an on-vehicle communication system 1 according to the embodiment. The on-vehicle communication system 1 includes the smart control unit 300 and the control device 40. The smart control unit 300 is a component of a smart key system 2 (described later).

The smart control unit 300 is connected to the starter switch 29, the main switch an electromagnetic lock 70 (including a lock device of each portion of the vehicle), the display panel 26, the control device 40, an announcement drive device (not shown) that operates a variety of announcement means in response to an operation of the smart key system 2, and the like. The announcement drive device performs, for example, at least one (answerback) of a visual sign such as blinking of a hazard lamp and an auditory sign such as sounding of an electronic sound when the smart key system 2 performs locking and unlocking of the lock device of each portion of the vehicle. Thereby, the user can know that locking and unlocking of the lock device of each portion of the vehicle are performed.

The control device 40 is, for example, an integrated ECU (Electric Control Unit) and functions as a control unit of the entire on-vehicle communication system 1. The control device 40 may be a Fi-ECU (Fuel Injection-Engine Control Unit). Hereinafter, the control device 40 is referred to as an ECU 40. An ON signal from the main switch and an engine start operation signal from the starter switch 29 are input to the ECU 40 through the smart control unit 300. Further, a stand use detection signal from a side stand switch 17*a* for detecting a standing state of the side stand 17, a variety of detection signals for detecting an operation state of the engine 21, and the like are input to the ECU The ECU 40 includes an engine control portion 41 that controls driving or the like of the engine 21 and an engine start control portion 42 that performs a start control of the engine 21.

The engine control portion 41 and the engine start control portion 42 are implemented, for example, by a processor such as a CPU (Central Processing Unit) or a GPU (Graphics Processing Unit) executing a program (software). Some or all of these components may be implemented by hardware (a circuit part including circuitry) such as an LSI (Large Scale Integration), an ASIC (Application Specific Integrated Circuit), or a FPGA (Field-Programmable Gate Array) or may be implemented by software and hardware in cooperation. The program may be stored in advance in a storage portion of the ECU 40 or may be stored in a removable storage medium such as a DVD or a CD-ROM and be installed in the storage portion by the storage medium being mounted in a drive device.

The smart key system 2 is a system in which a communication device including a close-range communication function is utilized as a key of the motorcycle 11. The smart key system 2 enables locking and unlocking of each portion of the motorcycle 11. In the present embodiment, the user terminal device 100 or the dedicated remote key 4 is available as the smart key of the motorcycle 11.

For example, the smart key system 2 includes the user terminal device 100 held by a user such as a driver and the smart control unit 300 which is an on-vehicle device. The smart control unit 300 performs a bidirectional communication with the user terminal device 100 and performs the authentication process of the user terminal device 100. The smart key system 2 enables starting of the engine 21 and unlocking of each portion of the vehicle when the authenticity of the user terminal device 100 is confirmed by the authentication process.

Further, the smart key system 2 may include the dedicated remote key 4 held by a user such as a driver and the smart control unit 300 provided on the vehicle body of the motorcycle 11. The smart control unit 300 performs a bidirectional communication with the dedicated remote key 4 and performs the authentication process of the dedicated remote key 4. The smart key system 2 enables starting of the engine 21 and unlocking of each portion of the vehicle when the authenticity of the dedicated remote key 4 is confirmed by the authentication process.

<Smart Control Unit>

Figure 6:
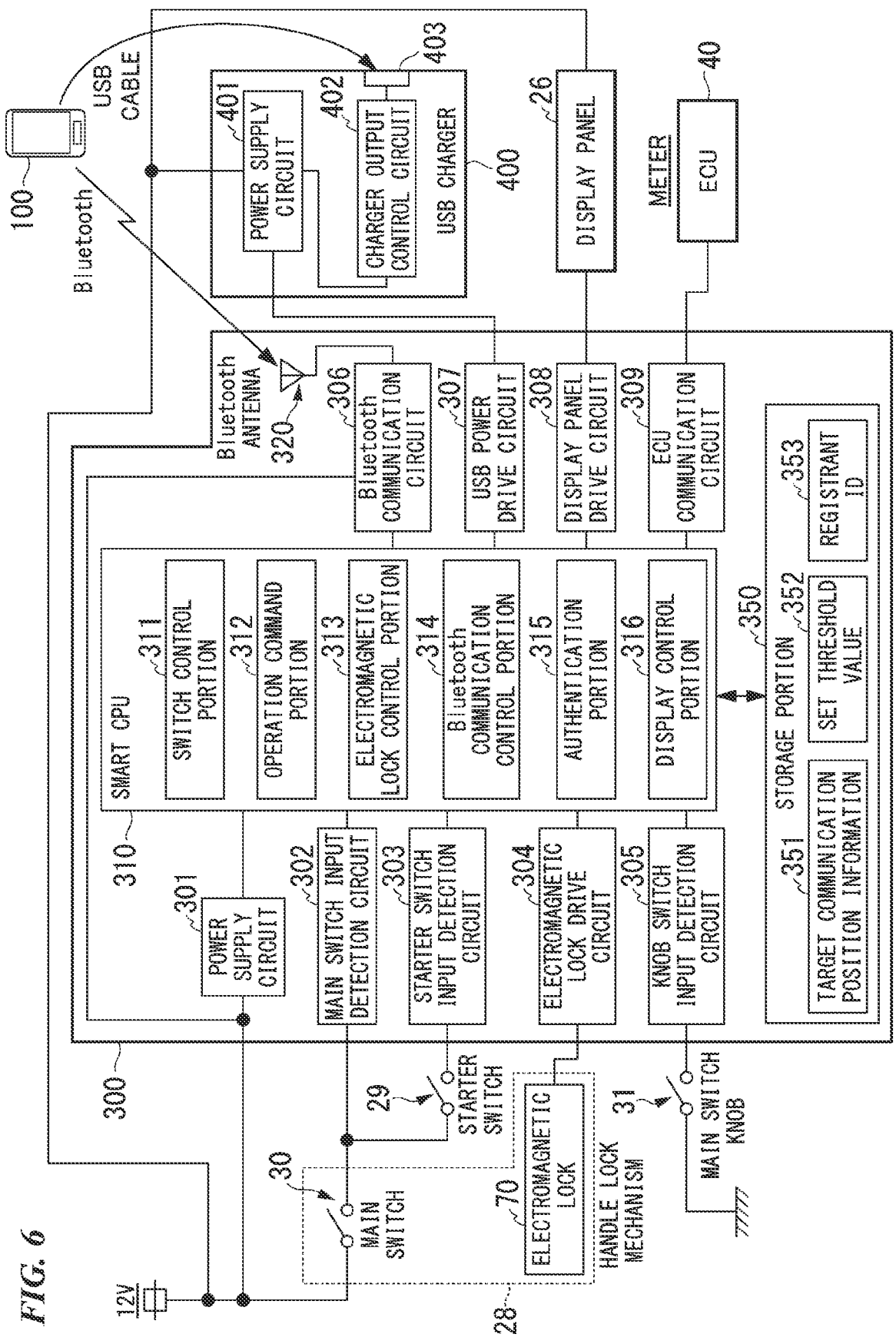
FIG. 6 is a functional block diagram of a smart control unit.

FIG. 6 is a functional block diagram of the smart control unit 300. The smart control unit 300 includes, for example, a power supply circuit 301, a main switch input detection circuit 302, a starter switch input detection circuit 303, an electromagnetic lock drive circuit 304, a knob switch input detection circuit 305, a Bluetooth communication circuit 306, a USB power drive circuit 307, a display panel drive circuit 308, an ECU communication circuit 309, a smart CPU 310, a Bluetooth antenna 320, and a storage portion 350. Here, the smart control unit 300 is described using an example in which the Bluetooth is utilized as the communication means; however, the communication means is not limited thereto. For example, the smart control unit 300 may utilize a close-range communication such as a wireless LAN (wi-fi) or an infrared communication. The Bluetooth is a registered trademark. Hereinafter, description that all of the Bluetooth are a registered trademark is omitted.

The power supply circuit 301 receives electric power required for the process of the smart control unit 300 from a power source on the motorcycle 11 side and supplies to each part.

The main switch input detection circuit 302 is connected to the main switch 30, and an ON signal or an OFF signal from the main switch 30 is input to the main switch input detection circuit 302. The main switch input detection circuit 302 detects the ON or OFF of the main switch 30 on the basis of the input signal and outputs the detection result to the smart CPU 310. For example, the main switch input detection circuit 302 detects the ON signal by the main switch knob 31 being pushed and then detects the OFF signal by the main switch knob 31 being pushed again.

The starter switch input detection circuit 303 is connected to the starter switch 29, and an engine start operation signal or an engine stop operation signal from the starter switch 29 is input to the starter switch input detection circuit 303. The starter switch input detection circuit 303 detects an engine drive or an engine stop on the basis of the input signal and outputs the detection result to the smart CPU 310. For example, the starter switch input detection circuit 303 detects an operation of commanding starting of the engine by the starter switch 29 being pushed in a state where the main switch 30 is in the ON state and the brake lever 29a on the right side of the bar handle 12 is gripped.

The electromagnetic lock drive circuit 304 is connected to the electromagnetic lock 70 and is controlled by the smart CPU 310. The electromagnetic lock drive circuit 304 causes the electromagnetic lock 70 to be in an excited state or an unexcited state and thereby causes the seat 18, the fuel lid 24, and the like to be in the locked state or the unlocked state.

The knob switch input detection circuit 305 is connected to the main switch knob 31, and a signal indicating a rotation operation from the main switch knob 31 is input to the knob switch input detection circuit 305. The knob switch input detection circuit 305 detects an OFF operation (rotation operation to the OFF position P1), an ON operation (rotation operation to the ON position P2), an unlock operation (rotation operation to the seat/fuel lock release position P3) that enables the open operation of the seat 18 and the fuel lid 24, and a lock operation (rotation operation to the lock position P4) that causes the lock of each portion of the vehicle including the handle lock to be in the locked state on the basis of the input signal and outputs the detection result to the smart CPU 310.

The Bluetooth communication circuit 306 uses the Bluetooth antenna 320 and communicates with a communication device present in the communication area. The communication area is within a range of a predetermined distance about the Bluetooth antenna 320. For example, the Bluetooth communication circuit 306 transmits a beacon signal, detects a communication device present in the communication area, and establishes a Bluetooth communication with the detected communication device.

The USB power supply drive circuit 307 is connected to a USB charger 400 and drives the power supply circuit 301 of the USB charger 400. The USB charger 400 includes, for example, a power supply circuit 401, a charger output control circuit 402, and a USB port 403. The power supply circuit 401 supplies electric power provided from the power source on the motorcycle 11 side to a terminal device connected through the USB port 403.

The display panel drive circuit 308 is connected to the display panel 26 and drives the display panel 26.

The ECU communication circuit 309 is connected to the ECU 40 and performs a wired communication. The ECU communication circuit 309 transmits information output from the smart CPU 310 to the ECU 40.

The storage portion 350 stores, for example, target communication position information 351, a set threshold value 352, and a registrant ID 353.

The target communication position information 351 includes information on a target communication position at which the user terminal device 100 should be located when registering a set threshold value of a received radio wave strength (hereinafter, referred to as a RSSI (Received Signal Strength Indication)). The "registering a set threshold value" includes a case of registering an initial value and a case of changing an already registered value. The target communication position is represented by information on a relative position with respect to the motorcycle 11. For example, the target communication position is indicated by four directions which are forward, rearward, rightward, and leftward directions about a predetermined position (for example, the main switch 30) of the motorcycle 11. The embodiment is not limited thereto, and the target communication position may be indicated by an orientation about the predetermined position (for example, the main switch 30) of the motorcycle 11. The target communication position is a position where the RSSI value is the lowest based on the RSSI characteristics measured in advance.

The target communication position may include information indicating the direction of a user when standing at the target communication position. For example, when the human body is present between the smart control unit 300 and the user terminal device 100, there is a possibility that the RSSI is affected by the human body and is changed. Therefore, the target communication position may include information of commanding that the user terminal device 100 is held in a state where the smart control unit 300 is on the back side and transimission of the signal is performed.

The set threshold value 352 is a threshold value of the RSSI registered by a registration process. The set threshold value is a reference value for defining an area (hereinafter, referred to as an authentication area) in which an authentication target present around the motorcycle 11 can be detected from the viewpoint of security. The set threshold value is set to a value such that an authentication process with respect to an authentication target that is away from the motorcycle 11 is not performed. For example, the set threshold value is an RSSI value detected from the user terminal device 100 through the Bluetooth antenna 320 in an area (for example, a predetermined area including the target communication position) where the RSSI value is the lowest in the RSSI characteristics.

The registrant ID 353 is information indicating the authenticity of the user terminal device 100 and is identification information given to a registrant for performing ID authentication. The information indicating the authenticity of the user terminal device 100 is not limited to the ID information registered in advance. For example, the information may be a random number or the like issued for a limited duration of use.

The smart CPU 310 includes, for example, a switch control portion 311, an operation command portion 312, an electromagnetic lock control portion 313, a Bluetooth communication control portion 314, an authentication portion 315, and a display control portion 316. The switch control portion 311, the operation command portion 312, the electromagnetic lock control portion 313, the Bluetooth communication control portion 314, the authentication portion 315, and the display control portion 316 are implemented, for example, by a processor such as a CPU or a GPU executing a program (software). Some or all of these components may be implemented by hardware (a circuit part including circuitry) such as an LSI, an ASIC, or a FPGA or may be implemented by software and hardware in cooperation. The program may be stored in advance in the storage portion 350 or may be stored in a removable storage medium such as a DVD or a CD-ROM and be installed in the storage portion by the storage medium being mounted in a drive device.

The switch control portion 311 controls the rotation of the main switch knob 31 on the basis of the authentication result by the authentication portion 315. For example, when the authenticity of the user terminal device 100 is confirmed by the authentication process, the switch control portion 311 enables or activates the rotation operation of the main switch knob 31. The embodiment is not limited thereto, and when the authenticity of the user terminal device 100 is confirmed by the authentication process, the switch control portion 311 may enable or activate the operation of the starter switch 29, the seat/fuel lock release switch 32, or another switch.

The operation command portion 312 transmits information input from the main switch input detection circuit 302, the starter switch input detection circuit 303, or the knob switch input detection circuit 305 to the ECU 40 using the ECU communication circuit 309. For example, when the engine start operation signal or the engine stop operation signal is input from the starter switch input detection circuit 303, the operation command portion 312 transmits an engine start permission signal or an engine stop permission signal to the ECU 40 using the ECU communication circuit 309, provided that the authenticity of the user terminal device 100 is confirmed by the authentication process. Instead of transmitting the engine stop permission signal, the engine start permission signal may not be transmitted.

The electromagnetic lock control portion 313 controls the electromagnetic lock on the basis of the authentication result by the authentication portion 315. For example, when the authenticity of the user terminal device 100 is confirmed by the authentication process, the electromagnetic lock control portion 313 outputs a command based on the information input from the knob switch input detection circuit 305 to the electromagnetic lock drive circuit 304 and controls unlocking or locking of the electromagnetic lock 70. For example, when information indicating an unlock operation is input from the knob switch input detection circuit 305, the electromagnetic lock 70 is controlled so as to enable an open operation of the seat 18 and the fuel lid 24. On the other hand, when information indicating a lock operation is input from the knob switch input detection circuit 305, the electromagnetic lock 70 is controlled so as to disable an open operation of the seat 18 and the fuel lid 24.

The Bluetooth communication control portion 314 controls the Bluetooth communication circuit 306 and communicates with the user terminal device 100 present in the communication area by using the Bluetooth antenna 320. For example, the Bluetooth communication control portion 314 transmits a beacon signal from the Bluetooth antenna 320 and determines whether or not a responding user terminal device 100 is present. When there is a user terminal device 100 that responds to the beacon signal, the Bluetooth communication control portion 314 reads target communication position information from the storage portion 350 and transmits the target communication position information to the user terminal device 100. When the dedicated remote key 4 communicates with the smart control unit 300 or when it is set by a user that information is not displayed on the user terminal device 100, the Bluetooth communication control portion 314 causes the display panel 26 to display information indicating a target communication position on the basis of the target communication position information read from the storage portion 350.

The Bluetooth communication control portion 314 acquires a RSSI value, for example, on the basis of a radio wave signal received from the user terminal device 100 through the Bluetooth antenna 320 and registers the RSSI value as a set threshold value in the set threshold value 352 of the storage portion 350. Hereinafter, the process of registering the set threshold value of the RSSI in this way is referred to as a RSSI registration mode.

Further, when there is a request of transmitting the acquired RSSI value from the user terminal device 100, the Bluetooth communication control portion 314 transmits the acquired RSSI value to the user terminal device 100. Hereinafter, the process of transmitting the acquired RSSI value to the user terminal device 100 for confirming the user in this way is referred to as a threshold value confirmation mode. The threshold value confirmation mode may use a RSSI value before being registered as the set threshold value or may use a RSSI value registered as the set threshold value.

The authentication portion 315 performs a predetermined advance process and a predetermined authentication process on the basis of the information received through the Bluetooth antenna 320. The advance process is, for example, a process of determining whether or not the RSSI value of a signal received through the Bluetooth antenna 320 is equal to or more than the set threshold value registered in the storage portion 350. The authentication portion 315 performs the authentication process when it is determined by the advance process that the RSSI value of the signal received through the Bluetooth antenna 320 is equal to or more than the set threshold value registered in the storage portion 350.

As the authentication process, for example, when the ID information received from the user terminal device 100 matches a registrant ID that is registered in advance, the authentication portion 315 authenticates legitimate information from a registrant registered in advance. That is, the authenticity of the user terminal device 100 is confirmed.

When the ID information received from the user terminal device 100 is authenticated by the authentication portion 315, the electromagnetic lock control portion 313 performs the unlock process described above.

The display control portion 316 controls the display panel drive circuit 308 and causes the display panel 26 to display predetermined information.

Next, an example of authentication between the smart control unit 300 and the user terminal device 100 is described. The authentication between the smart control unit 300 and the dedicated remote key 4 is similar, and in that case, the user terminal device 100 may be read as the dedicated remote key 4 in the following description.

The smart key system 2 performs a bidirectional communication between the user terminal device 100 and the smart control unit 300, for example, by activating the main switch knob 31, a start operation of the user terminal device 100, or the like when a user terminal device 100 in a state where the power is on enters a specified authentication area. By this bidirectional communication, the smart control unit 300 acquires ID information from the user terminal device 100 and performs authentication of the user terminal device 100. When the user terminal device 100 is authenticated, the ON operation of the main switch knob 31 is enabled, the handle lock is released, and the release of the lock of each part of the vehicle is enabled.

The entry of the user terminal device 100 into the specified authentication area satisfies the condition, for example, when it is determined in the advance process by the smart control unit 300 that the RSSI value of the signal received from the user terminal device 100 is equal to or more than the set threshold value. The authentication area is, for example, a range in which the RSSI value of the set threshold value is ensured and is a range having a radius of several meters around a predetermined position of the motorcycle 11.

The smart key system 2 stops the communication between the user terminal device 100 and the smart control unit 300 when the user terminal device 100 exits the authentication area or when the power of the user terminal device 100 is turned off. The smart key system 2 stops the communication between the user terminal device 100 and the smart control unit 300 by the OFF operation (rotation operation to the OFF position P1) of the main switch knob 31.

The present embodiment is described using an example in which authentication is performed by monitoring the radio wave strength of a signal transmitted from the user terminal device 100; however, the embodiment is not limited thereto. For example, authentication may be performed by monitoring the radio wave strength of the signal transmitted from the motorcycle 11.

When monitoring the radio wave strength of the signal transmitted from the motorcycle 11, the Bluetooth communication control portion 314 acquires a RSSI value based on the radio wave signal received by the user terminal device 100 from the Bluetooth antenna 320. For example, the Bluetooth communication control portion 314 acquires the RSSI value by receiving, from the user terminal device 100 via the Bluetooth antenna 320, the RSSI value acquired by the user terminal device 100 on the basis of the radio wave signal received by the user terminal device 100. Then, the Bluetooth communication control portion 314 registers the acquired RSSI value as the set threshold value in the set threshold value 352 of the storage portion 350. In the advance process, the user terminal device 100 transmits the information of the radio wave strength received by the user terminal device 100 to the motorcycle 11, and the authentication portion 315 performs a determination on the basis of the information of the radio wave strength received by the user terminal device 100. That is, the advance process is a process of determining whether or not the RSSI value of the radio wave signal received by the user terminal device 100 from the Bluetooth antenna 320 is equal to or more than the set threshold value registered in the storage portion 350. Thereby, since authentication becomes possible according to the strength of the radio waves emitted by the motorcycle 11 itself, authentication can be performed without depending on the performance of the user terminal device 100.

<User Terminal Device>

Figure 7:
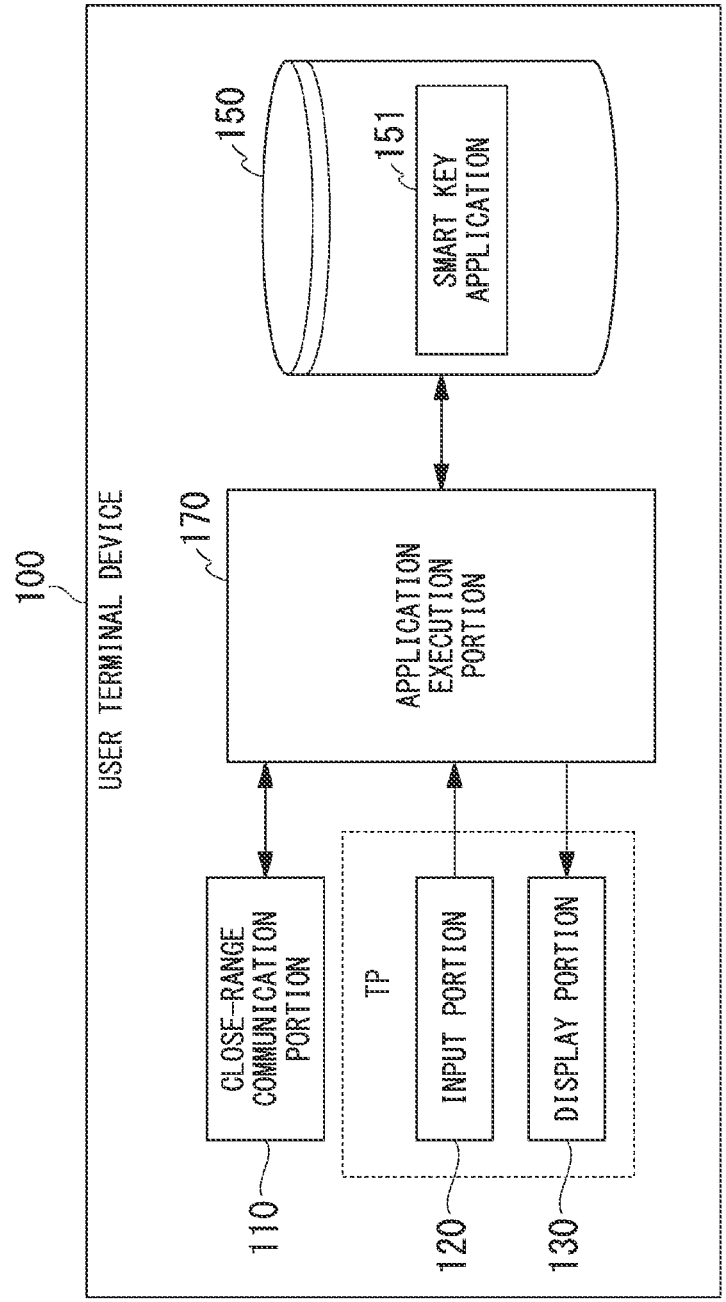
FIG. 7 is a functional block diagram of a user terminal device.

FIG. 7 is a functional block diagram of the user terminal device 100. The user terminal device 100 is, for example, a portable terminal device having at least a communication function and a display function such as a mobile phone such as a smartphone, a tablet terminal, or a PDA (Personal Digital Assistant). The user terminal device 100 includes, for example, a communication portion 110, an input portion 120, a display portion 130, a storage portion 150, and an application execution portion 170.

The communication portion 110 is, for example, a wireless module for utilizing the Bluetooth or the like and includes an antenna, a transceiver device, and the like. The input portion 120 includes, for example, some or all of a touch panel TP formed integrally with the display portion 130, a variety of keys, a button, a dial switch, a mouse, and the like. The display portion 130 is, for example, an LCD (Liquid Crystal Display), an organic EL (Electro luminescence) display device, or the like.

The storage portion 150 is implemented by, for example, a RAM (Random Access Memory), a ROM (Read Only Memory), a flash memory, a SD card, a register, or the like. A smart key application 151 is stored in the storage portion 150. The smart key application 151 is a program that causes the display portion 130 to display an interface for utilizing the user terminal device 100 as a smart key and causes the user terminal device 100 to perform a process based on information input via the interface.

The application execution portion 170 is implemented, for example, by a processor such as a CPU executing the smart key application (program) 151 stored in the storage portion 150. For example, the smart key application 151 may be downloaded from another device via a network NW or may be pre-installed in the user terminal device 100 in advance.

<About Target Communication Position Information>

Figure 8:
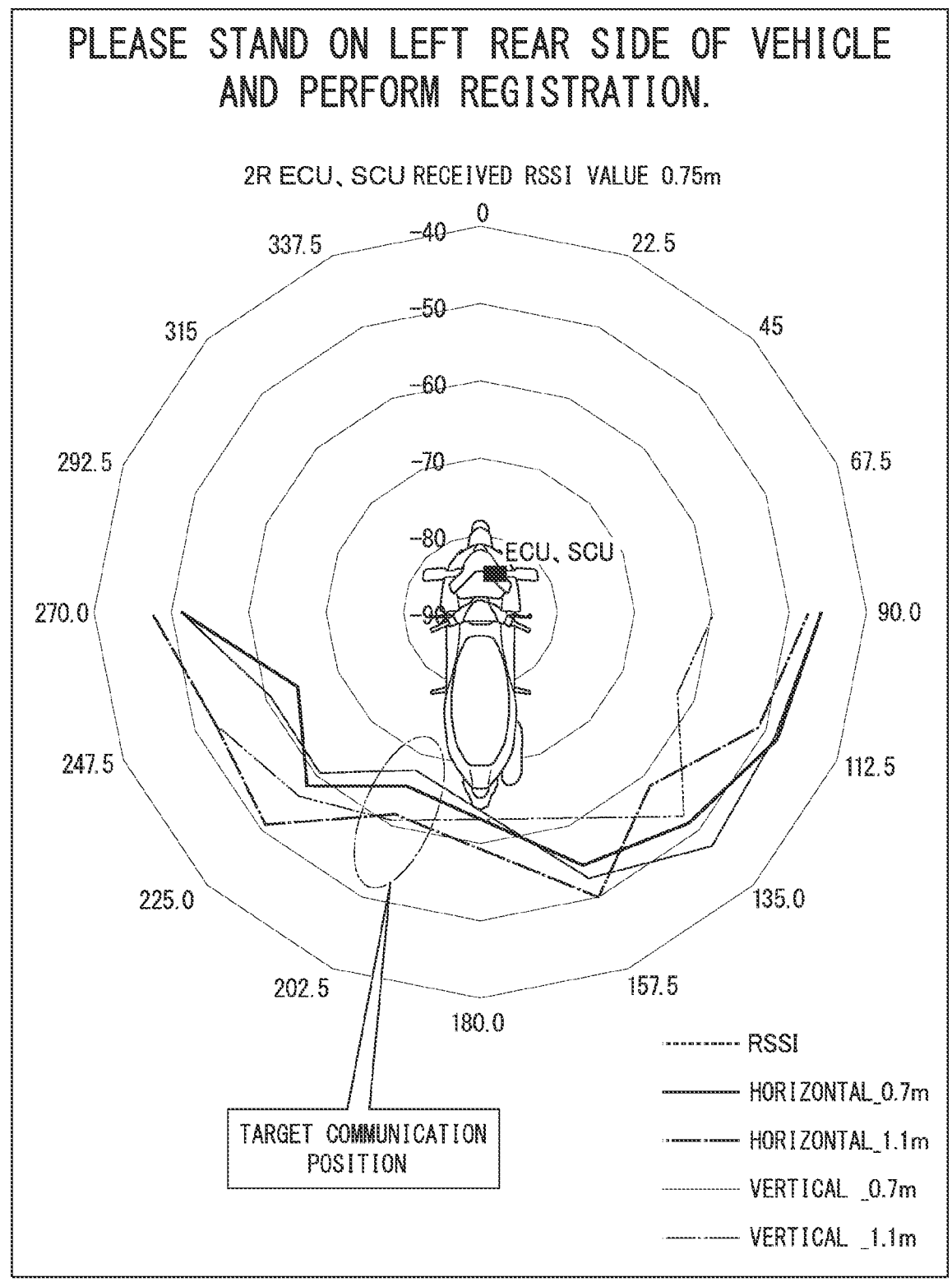
FIG. 8 is a view showing a display example of target communication position information.

FIG. 8 is a view showing a display example of target communication position information. The target communication position information is determined, for example, in accordance with the RSSI characteristics obtained in a pretest. An image that displays the target communication position information includes, for example, an elliptical graphic indicating a target communication position and superimposed on an image indicating the RSSI characteristics. The RSSI characteristics are obtained by acquiring data for 30 seconds at each angle around the main switch 30 and calculating an average value.

The RSSI characteristics shown in the drawing indicate that the RSSI characteristics are not uniform and the RSSI value is low in some areas on a left rear side of the motorcycle 11. In the example of the drawing, the smart control unit 300 is provided at a forward position of the steering shaft 36 of the motorcycle 11. Therefore, the RSSI value is low in the area where the steering shaft 36 is present between the smart control unit 300 and the user terminal device 100, that is, the left rear side of the motorcycle 11.

<About Set Threshold Value>

Figure 9:
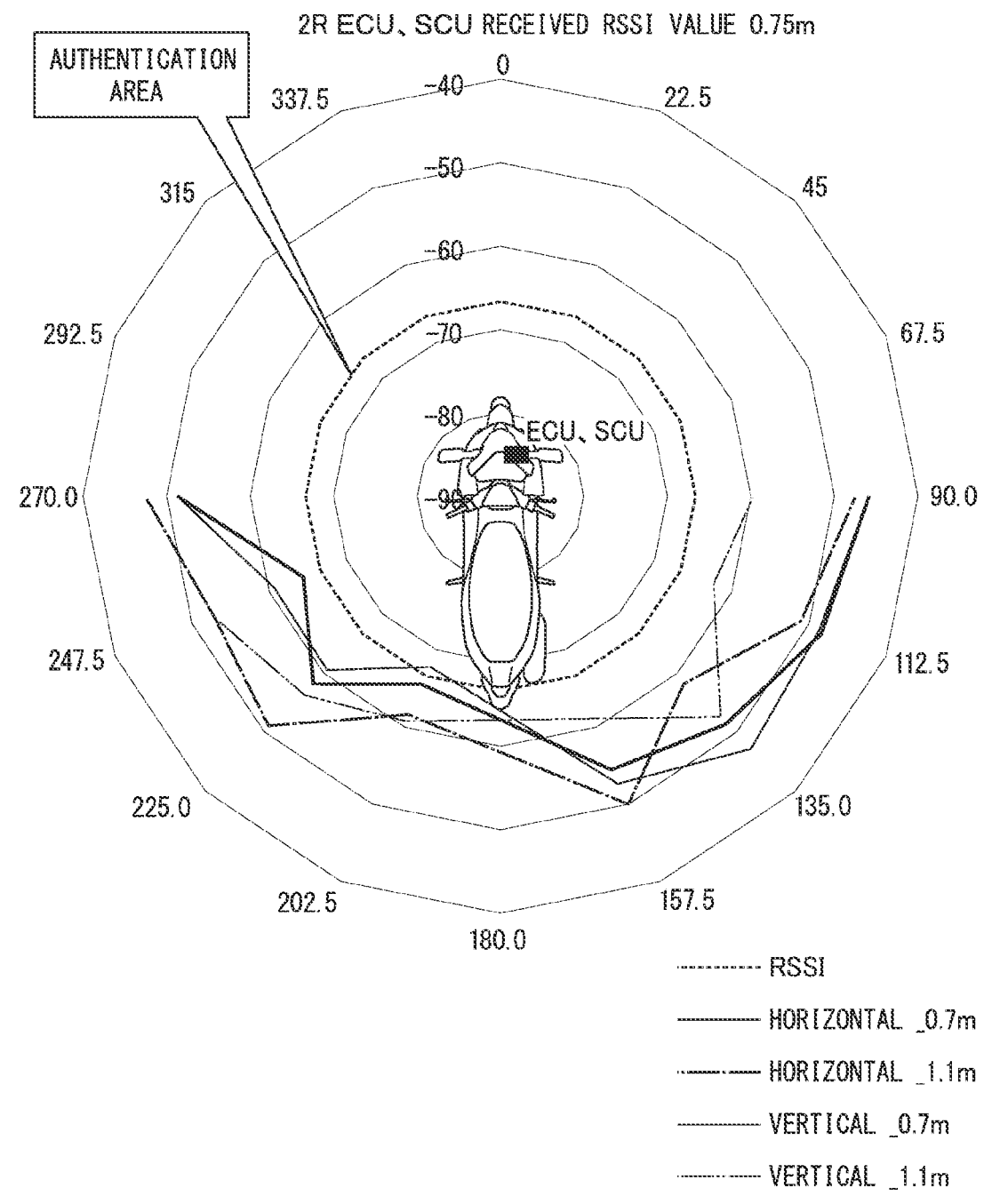
FIG. 9 is a view showing a display example of a set threshold value.

FIG. 9 is a view showing a display example of a set threshold value. For example, the set threshold value is displayed to be superimposed on the image indicating the RSSI characteristics similarly to the target communication position information. In the example shown in the drawing, the set threshold value is −67 dBm, and the area (authentication area) where the RSSI value is equal to or more than the set threshold value and the advance process is performable is a range having a radius of 0.8 m around the main switch 30.

In this way, by setting the area where the RSSI value is the lowest in the RSSI characteristics as the target communication position and employing the RSSI value acquired at the target communication position as the set threshold value, it is possible to perform unlocking from any angle. Further, it is possible to prevent the occurrence of a problem in which locking can be performed only at a specific position at the time of unlocking, a problem in which locking is suddenly performed at the same time as the IG-OFF at the time of locking, and the like.

<Flowchart>

Figure 10:
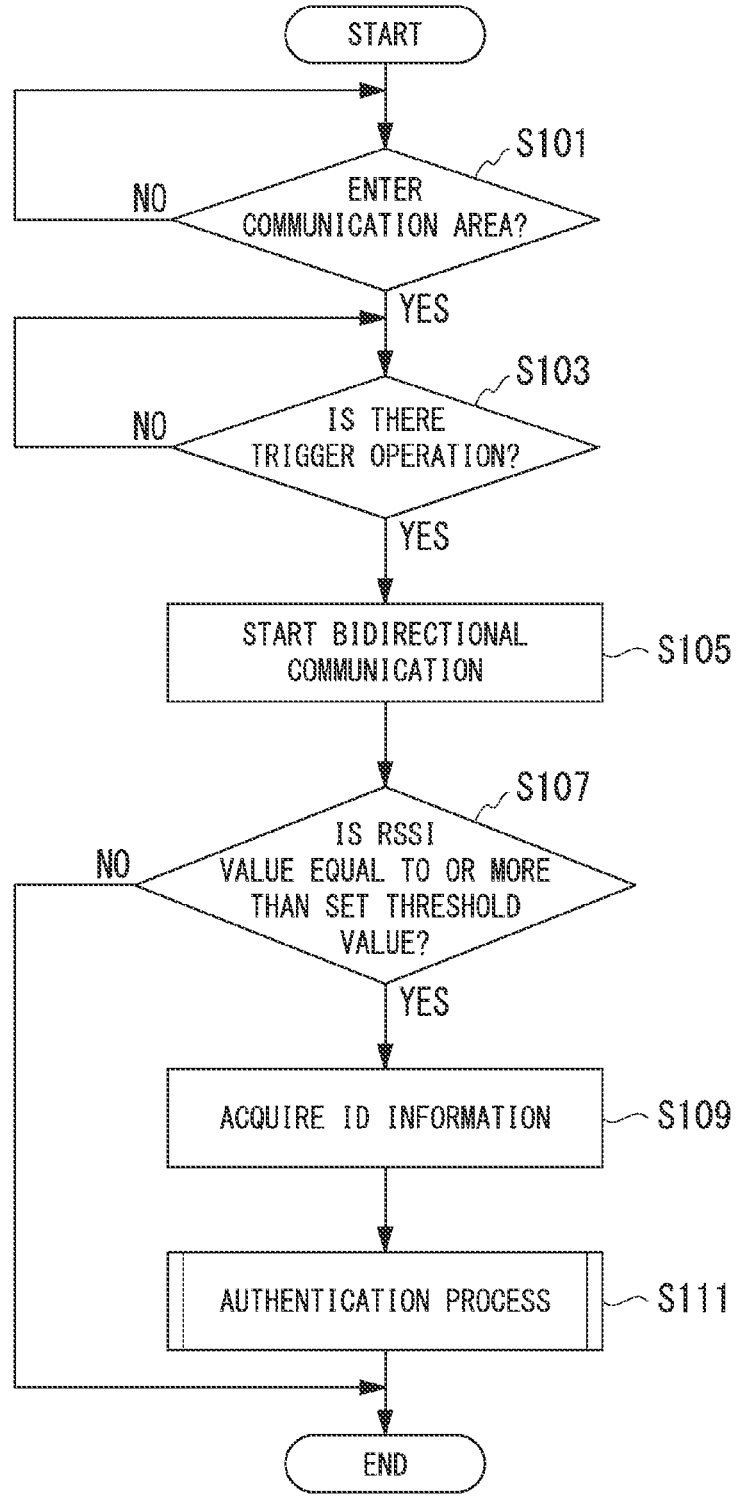
FIG. 10 is a flowchart showing a process flow of an advance process by an authentication portion.

FIG. 10 is a flowchart showing a process flow of the advance process by the authentication portion 315. The embodiment is described using an example in which a user utilizes the user terminal device 100. However, the embodiment is not limited thereto, and the user may use the dedicated remote key 4. In that case, the user terminal device 100 may be read as the dedicated remote key 4 in the following description.

First, the Bluetooth communication control portion 314 transmits a beacon signal from the Bluetooth antenna 320 and determines whether or not a user terminal device 100 in which the smart key application is activated enters the communication area on the basis of a response signal (Step S101). When the user terminal device 100 enters the communication area, the smart CPU 310 determines whether or not a trigger operation for starting a bidirectional communication between the smart control unit 300 and the user terminal device 100 is detected (Step S103). The trigger operation includes, for example, an operation of pushing the main switch knob 31, an operation of starting the smart key application 151 of the user terminal device 100 and touching a start button displayed on the touch panel TP, an operation of pushing the operation button 4a of the dedicated remote key 4, and the like. Here, the operation of starting the smart key application 151 of the user terminal device 100 and touching the start button displayed on the touch panel TP is performed.

When the trigger operation is detected, the Bluetooth communication control portion 314 starts the bidirectional communication with the user terminal device 100 present in the authentication area (Step S105).

Then, the authentication portion 315 refers to the set threshold value 352 of the storage portion 350 and determines whether or not the RSSI value of the signal received from the user terminal device 100 through the Bluetooth antenna 320 is equal to or more than the set threshold value (Step S107). When the RSSI value of the signal received from the user terminal device 100 is equal to or more than the set threshold value (that is, when it is determined that the user terminal device 100 is in the authentication area), the authentication portion 315 acquires the ID information from the user terminal device 100 (Step S109) and performs the authentication process (Step S111).

Figure 11:
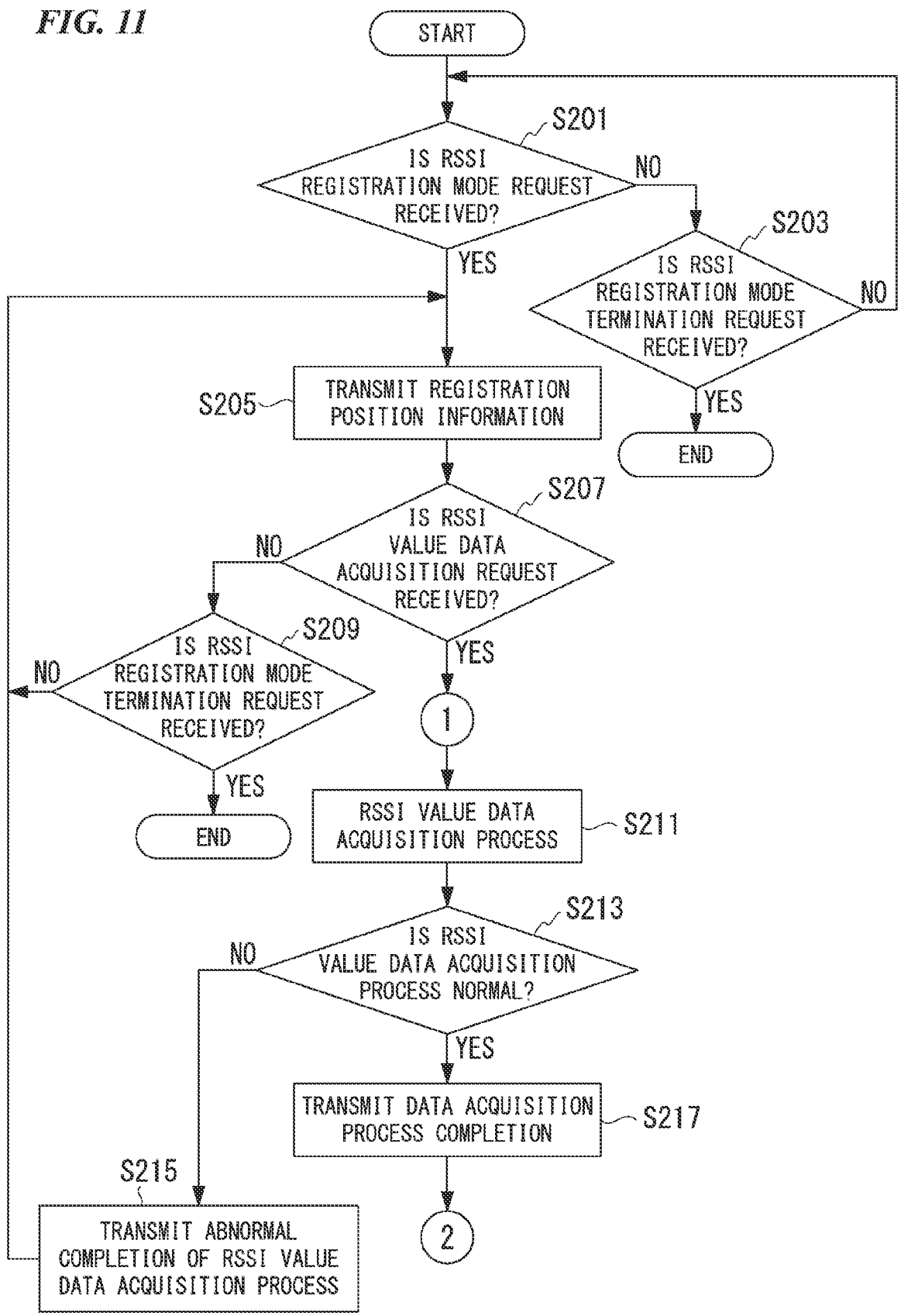
FIG. 11 is a flowchart showing a process flow of a RSSI registration mode by a Bluetooth communication control portion.
Figure 12:
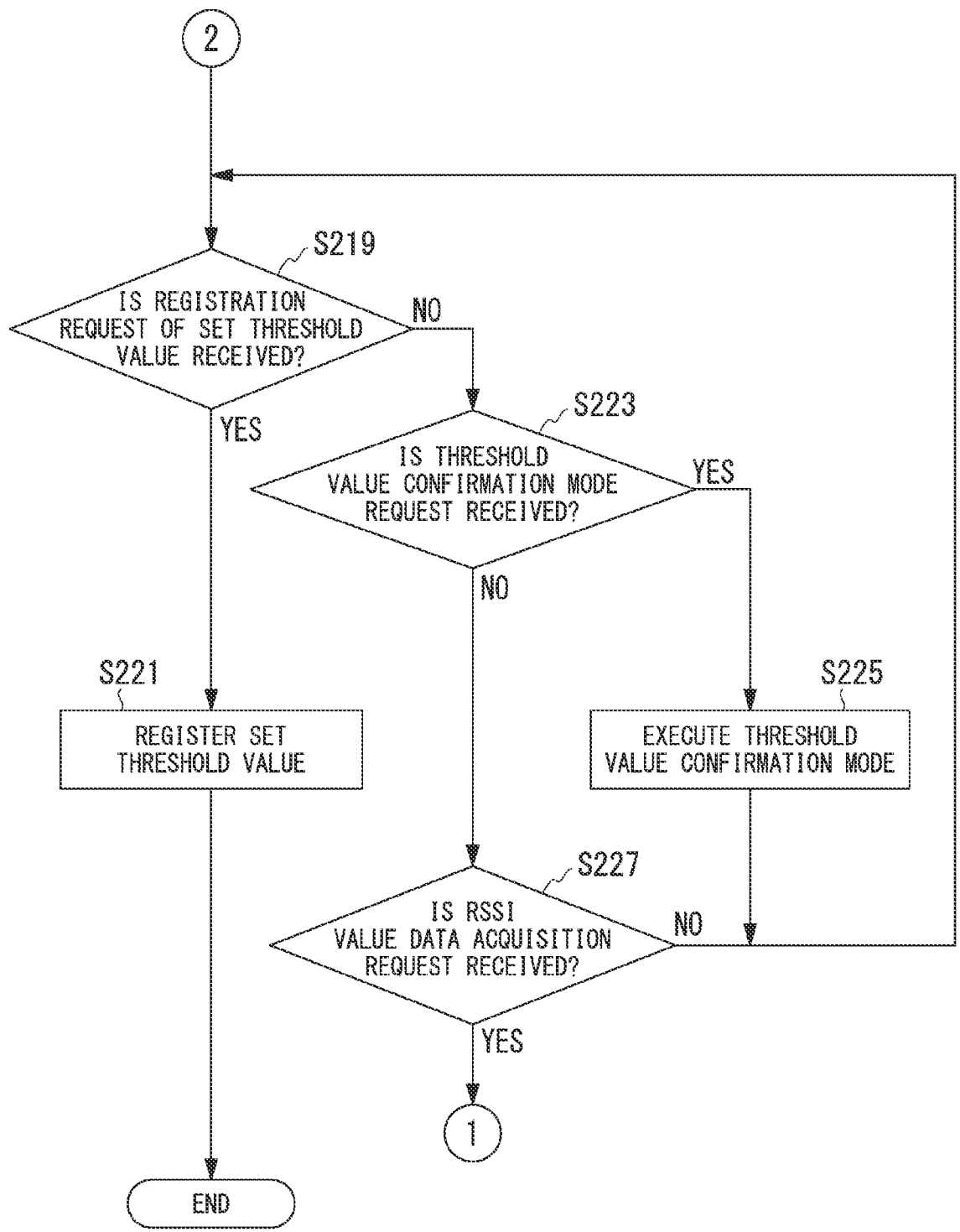
FIG. 12 is a flowchart showing a process flow of the RSSI registration mode by the Bluetooth communication control portion.

FIG. 11 and FIG. 12 are a flowchart showing a process flow of the RSSI registration mode by the Bluetooth communication control portion 314. First, the Bluetooth communication control portion 314 determines whether or not an execution request of the RSSI registration mode is received (Step S201). When the execution request of the RSSI registration mode is not received, whether or not a termination request of the RSSI registration mode is received is determined (Step S203). Then, the Bluetooth communication control portion 314 terminates the process when the termination request of the RSSI registration mode is received, and the Bluetooth communication control portion 314 returns to Step S201 and repeats the process when the termination request of the RSSI registration mode is not received.

On the other hand, in the process of Step S201, when the execution request of the RSSI registration mode is received, the Bluetooth communication control portion 314 reads the target communication position information from the storage portion 350 and transmits the target communication position information (Step S205). Next, the Bluetooth communication control portion 314 determines whether or not an acquisition request of the RSSI value data is received (Step S207). The RSSI value data is a RSSI value of a signal from the communication device side for measuring the RSSI by the Bluetooth communication control portion 314.

When the acquisition request of the RSSI value data is not received in Step S207, the Bluetooth communication control portion 314 determines whether or not the termination request of the RSSI registration mode is received (Step S209). Then, the Bluetooth communication control portion 314 terminates the process when the termination request of the RSSI registration mode is received, and the Bluetooth communication control portion 314 returns to Step S205 and repeats the process when the termination request of the RSSI registration mode is not received.

On the other hand, when the acquisition request of the RSSI value data is received in Step S207, the Bluetooth communication control portion 314 executes a RSSI value data acquisition process (Step S211). For example, the Bluetooth communication control portion 314 acquires a RSSI value of a radio wave signal including the acquisition request of the RSSI value data.

Next, the Bluetooth communication control portion 314 determines whether or not the RSSI value data acquisition process is normal (Step S213). For example, when the acquired RSSI is within a normal range, the Bluetooth communication control portion 314 determines that the RSSI value data acquisition process is normal.

When the RSSI value data acquisition process is not normal, the Bluetooth communication control portion 314 transmits information indicating that the RSSI value data acquisition process is determined to be abnormal and completed (Step S215) and returns to Step S205. On the other hand, when the RSSI value data acquisition process is normal in the determination of Step S213, the Bluetooth communication control portion 314 transmits information indicating that the RSSI value data acquisition process is determined to be normal and completed (Step S217).

With reference to FIG. 12, the Bluetooth communication control portion 314 determines whether or not a registration request of the set threshold value is received (Step S219). When the registration request of the set threshold value is received, the Bluetooth communication control portion 314 registers the RSSI value acquired in the RSSI value data acquisition process of Step S211 as the set threshold value in the storage portion 350 (Step S221).

On the other hand, when the registration request of the set threshold value is not received in the determination of Step S219, the Bluetooth communication control portion 314 determines whether or not an execution request of the threshold value confirmation mode is received (Step S223). When the acquisition request of the RSSI value data is received, the Bluetooth communication control portion 314 executes the threshold value confirmation mode (Step S225) and returns to Step S219. For example, the Bluetooth communication control portion 314 transmits, to the user terminal device 100, information for confirming with the user whether or not the acquired RSSI value is registered as the set threshold value.

On the other hand, when the execution request of the threshold value confirmation mode is not received in the determination of Step S223, the Bluetooth communication control portion 314 again determines whether or not the acquisition request of the RSSI value data is received (Step S227). When the acquisition request of the RSSI value data is received, the Bluetooth communication control portion 314 moves to Step S211.

Figure 13:
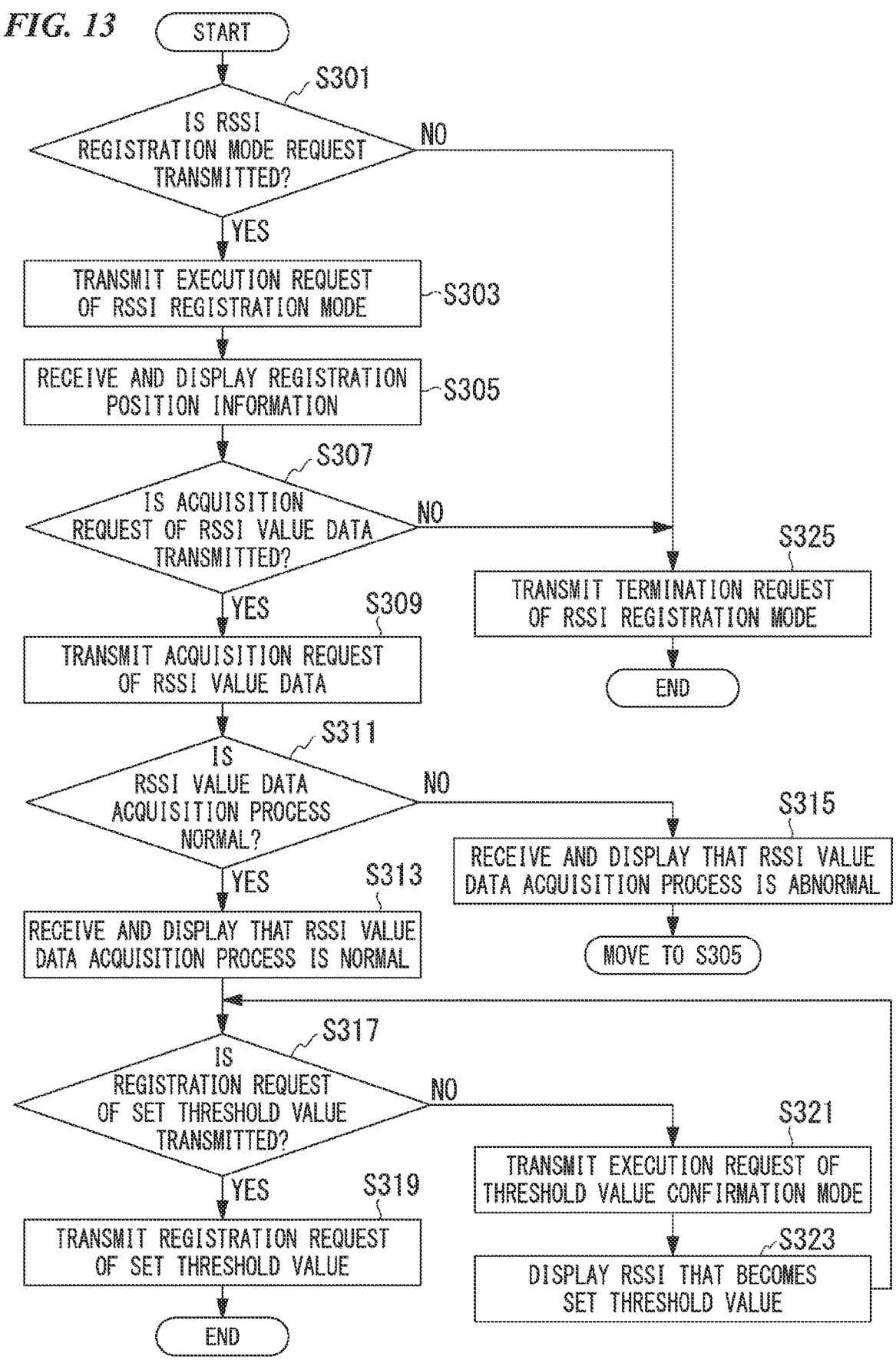
FIG. 13 is a flowchart showing a process flow of an application execution portion.

FIG. 13 is a flowchart showing a process flow of the application execution portion 170. By the user terminal device 100 executing the smart key application 151, the application execution portion 170 causes the touch panel TP to display a screen of commanding the execution of the RSSI registration mode.

When the execution of the RSSI registration mode is commanded by the user through the touch panel TP (Step S301—YES), the application execution portion 170 transmits the execution request of the RSSI registration mode (Step S303). Thereby, the target communication position information is transmitted from the smart control unit 300, and the application execution portion 170 displays the received target communication position information on the touch panel TP (Step S305). An example of the screen displayed at this time is the image shown in FIG. 8. This screen may include an operation icon that commands the acquisition request of the RSSI value data.

Next, when the acquisition request of the RSSI value data is commanded by the user (Step S307—YES), the application execution portion 170 transmits the acquisition request of the RSSI value data (Step S309). Thereby, the RSSI value is acquired, and whether or not the acquired RSSI value is normal is determined by the smart control unit 300. When the RSSI value is normal (Step S311—YES), the application execution portion 170 receives information indicating that the RSSI value is normal and displays that the RSSI value is normal on the touch panel TP (Step S313). On the other hand, when the RSSI value is abnormal (Step S311—NO), the application execution portion 170 receives information indicating that the RSSI value is abnormal, displays that the RSSI value is abnormal on the touch panel TP (Step S315), and moves to Step S305.

Next, when the registration request of the set threshold value is commanded by the user (Step S317—YES), the application execution portion 170 transmits the registration request of the set threshold value (Step S319) and terminates the process. On the other hand, when the registration request of the set threshold value is not commanded by the user (Step S317—NO), the application execution portion 170 transmits the execution request of the threshold value confirmation mode (Step S321), receives the RSSI that becomes the set threshold value, and displays the RSSI on the touch panel TP (Step S323).

When the termination of the RSSI registration mode is commanded by the user in Step S301 or Step S307, the application execution portion 170 transmits the termination request of the RSSI registration mode (Step S325) and terminates the process.

The target communication position is located on an opposite side of the Bluetooth antenna 320 across a shield portion that is a configuration member of the motorcycle 11 and shields radio waves. The shield is, for example, the steering shaft 36 or the bar handle 12.

Figure 14:
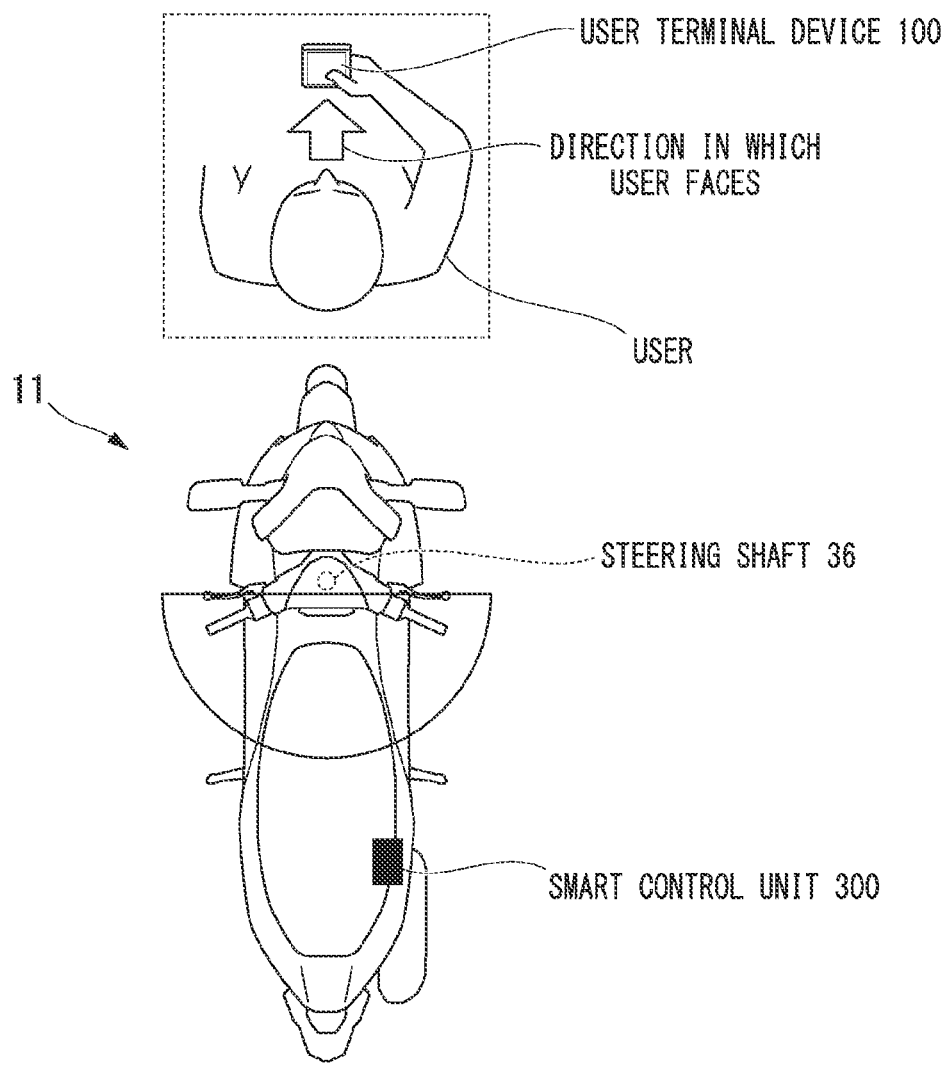
FIG. 14 is an example of a target communication position when the smart control unit is located at a vehicle rearward position.

FIG. 14 is an example of a target communication position when the smart control unit 300 is located at a vehicle rearward position. As the target communication position information, the smart control unit 300 transmits an image as shown in FIG. 14 to the user terminal device 10. In the example shown in the drawing, an area enclosed by a dotted line is the target communication position. When the smart control unit 300 that includes the Bluetooth antenna 320 is arranged at a further rearward position of the motorcycle 11 than the steering shaft 36, the target communication position is a further forward position of the motorcycle 11 than the steering shaft 36 and is, for example, near the front wheel. The orientation of the user is also displayed in the area enclosed by the dotted line. In this example, an illustration showing that a user holds the user terminal device 100 such that his/her back is directed toward the smart control unit 300 is displayed.

Figure 15:
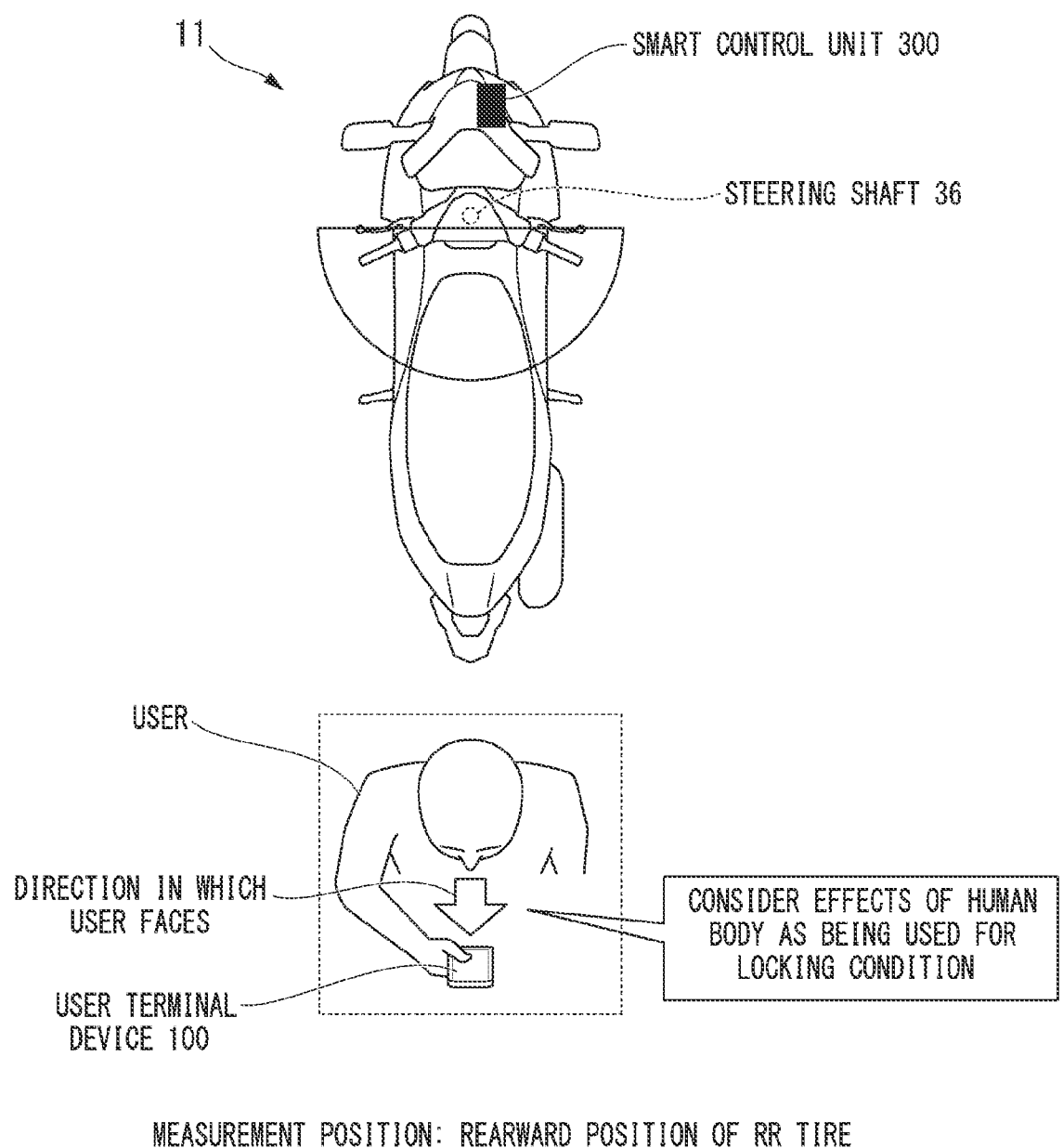
FIG. 15 is an example of a target communication position when the smart control unit is located at a vehicle forward position.

FIG. 15 is an example of a target communication position when the smart control unit 300 is located at a vehicle forward position. As the target communication position information, the smart control unit 300 transmits an image as shown in FIG. 15 to the user terminal device 10. In the example shown in the drawing, an area enclosed by a dotted line is the target communication position. When the smart control unit 300 that includes the Bluetooth antenna 320 is arranged at a further forward position of the motorcycle 11 than the steering shaft 36, the target communication position is a further rearward position of the motorcycle 11 than the steering shaft 36 and is, for example, near the rear wheel. The orientation of the user is also displayed in the area enclosed by the dotted line. In this example, an illustration showing that a user holds the user terminal device 100 such that his/her back is directed toward the smart control unit 300 is displayed.

As shown in FIG. 14 and FIG. 15, the antenna and the target communication position are at the opposite side of each other across the steering shaft 36 which is a shield member, and thereby, it is possible to register the set threshold value of the RSSI in consideration of a shield effect by the shield member having a large shield effect.

The embodiment described above includes: an antenna that is provided on a vehicle and performs a close-range communication with a user terminal device present in a communication area around the vehicle; and a control portion that is provided on the vehicle and executes a predetermined authentication process when a radio wave strength of a signal received from the user terminal device via the antenna is equal to or more than a threshold value, wherein the control portion notifies a user of information on a target communication position at which the user terminal device should be located when registering the threshold value by using a notification portion, and thereby, it is possible to prevent a communication area of an on-vehicle device from becoming inappropriate.

Although an embodiment of the present invention has been described with reference to the drawings, the present invention is not limited to such an embodiment, and various modifications and substitutions can be made without departing from the scope of the present invention.

The present invention is not limited to the embodiment described above. For example, the present system is not limited to the motorcycle application and is broadly applicable to a saddle riding vehicle. The saddle riding vehicle includes all vehicles on which a driver rides by straddling the vehicle body and includes not only a motorcycle (including a motorized bicycle and a scooter-type vehicle) but also a three-wheeled vehicle (including a vehicle having two front wheels and one rear wheel in addition to a vehicle having one front wheel and two rear wheels) or a four-wheeled vehicle. Further, a vehicle including an electric motor as an engine is also included. Further, the present invention may be applied to an automobile having a vehicle room. Further, the present invention may be applied to a variety of devices that require a communication other than vehicles. For example, the present invention may be applied to devices such as a storage box or a bag that include a communication function.

DESCRIPTION OF THE REFERENCE SYMBOLS 1 on-vehicle communication system
2 smart key system
4 dedicated remote key
11 motorcycle
21 engine
30 main switch
31 main switch knob 40 ECU
300 smart control unit
310 smart CPU
311 switch control portion
312 operation command portion
313 electromagnetic lock control portion
314 Bluetooth communication control portion
315 authentication portion
316 display control portion

What is claimed is:

1. An on-vehicle communication system comprising:
an antenna that is provided on a vehicle and performs a close-range communication with a user terminal device present in a communication area around the vehicle; and
a control portion that is provided on the vehicle and executes a predetermined authentication process when a radio wave strength of a signal received from the user terminal device via the antenna or a signal received by the user terminal device from the antenna is equal to or more than a threshold value,
wherein the control portion notifies a user of information on a target communication position at which the user terminal device should be located when registering the threshold value by using a notification portion.

2. The on-vehicle communication system according to claim 1,
wherein notification is performed by the notification portion using the information on the target communication position as information on a relative position with respect to the vehicle.

3. The on-vehicle communication system according to claim 1,
wherein the control portion causes the user terminal device or a display portion provided on the vehicle to display the target communication position.

4. The on-vehicle communication system according to claim 1,
wherein the target communication position is a position on an opposite side of the antenna across a shield portion that is a configuration member of the vehicle and shields radio waves.

5. A saddle riding vehicle comprising:
the on-vehicle communication system according to claim 4.

6. The saddle riding vehicle according to claim 5,
wherein the shield portion is a steering shaft.

7. The saddle riding vehicle according to claim 6,
wherein the target communication position is a further rearward position of the vehicle than the steering shaft when the antenna is arranged at a further forward position of the vehicle than the steering shaft, and
the target communication position is a further forward position of the vehicle than the steering shaft when the antenna is arranged at a further rearward position of the vehicle than the steering shaft.

8. A computer-readable non-transitory storage medium including a program that causes an on-vehicle computer to:
perform a close-range communication, by using an antenna that is provided on a vehicle, with a user terminal device present in a communication area around the vehicle;
execute a predetermined authentication process when a radio wave strength of a signal received from the user terminal device via the antenna or a signal received by the user terminal device from the antenna is equal to or more than a threshold value; and
notify a user of information on a target communication position at which the user terminal device should be located when registering the threshold value by using a notification portion.

* * * * *